United States Patent [19]

Krehl et al.

[11] Patent Number: 4,888,452
[45] Date of Patent: Dec. 19, 1989

[54] CABLE CONDUIT FOR TEXTILE MACHINES

[75] Inventors: Gerhard Krehl; Helmut Vögeler, both of Altbach, Fed. Rep. of Germany

[73] Assignee: SKF Textilmaschinen-Komponenten GmbH, Fed. Rep. of Germany

[21] Appl. No.: 234,038

[22] Filed: Aug. 19, 1988

[30] Foreign Application Priority Data

Aug. 21, 1987 [DE] Fed. Rep. of Germany ....... 3727940

[51] Int. Cl.⁴ .................. D01H 13/14; H02G 3/04
[52] U.S. Cl. .................. 174/101; 57/100; 174/84 S; 174/97; 285/417
[58] Field of Search ........... 174/68.3, 84 S, 97, 174/101, 48, 49; 138/92, 116, 155, 158; 285/369, 417; 403/305; 439/94, 113, 120, 207, 209, 210, 214, 215; 57/1 R, 100, 136, 137

[56] References Cited

U.S. PATENT DOCUMENTS

| 3,512,805 | 5/1970 | Glatz | 403/305 X |
| 4,166,195 | 8/1979 | Schwab | 174/101 X |

FOREIGN PATENT DOCUMENTS

| 230536 | 1/1911 | Fed. Rep. of Germany | 174/97 |
| 1130492 | 5/1962 | Fed. Rep. of Germany | 174/68.3 |
| 2103110 | 8/1972 | Fed. Rep. of Germany | 174/97 |
| 2303593 | 10/1973 | Fed. Rep. of Germany | 174/97 |
| 3336214 | 5/1985 | Fed. Rep. of Germany | 57/100 |
| 1565658 | 3/1969 | France | 174/68.3 |
| 2292088 | 6/1976 | France | 174/97 |
| 2582161 | 11/1986 | France | 174/68.3 |
| 6611320 | 2/1967 | Netherlands | 174/68.3 |

Primary Examiner—Laramie E. Askin
Attorney, Agent, or Firm—Wigman & Cohen

[57] ABSTRACT

A cable conduit for textile machines houses the supply cables, ground plates and motor bars which are connected to the ground plates, for the drive and control of an individual drive of the textile machine. The cable conduit has a housing, a detachable cover provided on the housing, and an intermediate cover connected to the housing. The intermediate cover divides the housing into a partial conduit which is not accessible to the outside adapted to receive the supply cables, and a portion which is covered by the detachable cover and adapted to receive the ground plates and motor bars. Grooves formed in the housing securely receive the ground plates in the portion of housing covered by the detachable cover.

12 Claims, 2 Drawing Sheets

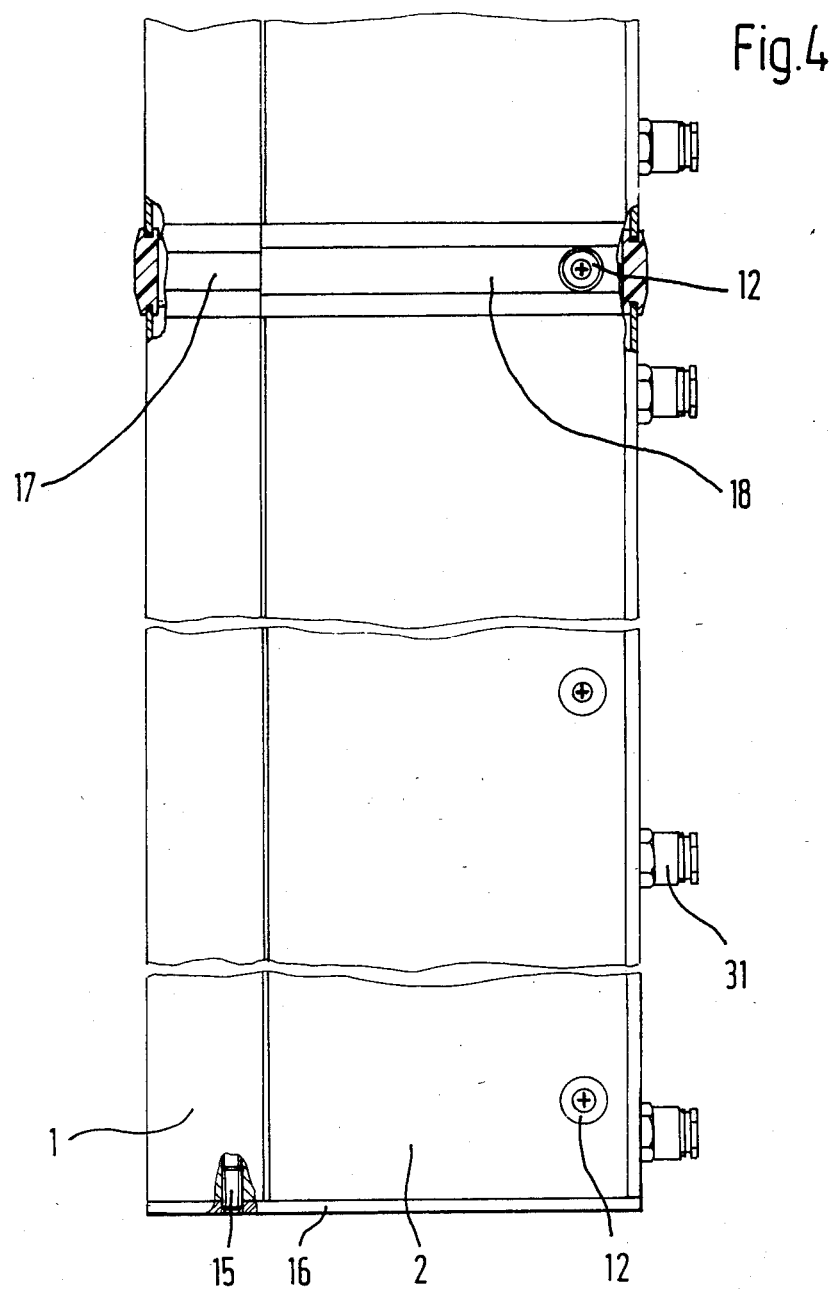

CABLE CONDUIT FOR TEXTILE MACHINES

BACKGROUND OF THE INVENTION

In a known cable conduit of the type described in the preamble of claim 1 of German Patent 3,336,214, all of the supply cables, flat cable and conductor plates necessary for the energy supply and for the control of electrical monitoring and switching devices are housed in a common space. A cable conduit of this type is only suitable for a system with a low energy demand.

SUMMARY AND OBJECTS OF THE INVENTION

The primary objective of this invention is to develop a cable conduit for a drive system for textile machines having a plurality of locations that securely houses the supply cable, ground plates, and motor bars for the drive and the control of the individual drives, is easily accessible, and makes it possible to easily exchange the motor bars. As used herein the term "motor bar" may be a plate of isolating or insulating material bearing or supporting the elements of the motor control and the plugs for connecting the motor control with a ground plate.

Briefly described, the aforementioned object is accomplished according to the invention by providing a cable conduit of this type having a housing, a detachable cover provided on the housing, and an intermediate cover connected to the housing. The intermediate cover divides the housing into a partial conduit which is no accessible to the outside adapted to receive the supply cables, and a portion which is covered y the detachable cover and adapted to receive the ground plates and motor bars. Means are formed in the housing for securely receiving the ground plates in the portion of the housing covered by the detachable cover.

The separation of a partial conduit, in which the supply cable is placed, assures an energy supply that fulfills all safety requirements for the individual drives of the textile machine, which can sometimes be very long. In further developing the invention, a ground plate encompassing the motor bars is securely clamped in the easily accessible portion of the cable conduit.

The housing, cover and the intermediate cover of the cable conduit include grooves and webs that engage with each other. Because these parts are made from extrusion-shaped aluminum, an electrical shielding is achieved in a simple manner, even between the supply cables and the motor bars placed on the ground plates, which motor bars are equipped with sensitive electronic switching and control elements.

In an additional feature of the invention, full-length round grooves are provided which receive self-cutting screws that secure end plates in place. These end plates seal the cable conduit at each end of the machine. The round grooves also serve to receive pins, which position a two-part sleeve connecting the abutting sections of the cable conduit. The cable conduit is divided into easy-to-handle sections, given the established lengths of textile machines.

The sleeve surrounds the wall portions of the adjacent housing, and has integral protrusions that engage in two full-length grooves which are provided on the back side of the housing. These grooves have a reverse cut to receive screw heads to attach the cable conduit to the machine. Adjacent covers are covered by a portion of the sleeve, which, with one groove, encompasses two webs of adjacent intermediate covers, and engages with one web in a groove of the other portion of the sleeve. Just as with the cover of the conduit, this portion of the sleeve is held in place with a rotary lock, so that the motor bars can be accessed easily by removing two sleeve sections and the cover of a conduit section.

Because the sleeve is made from an elastic material, and the grooves in which the cover engages are provided with a seal, the cable conduit satisfies the requirements of protective standard IP 54 (DDeusche Industrie Normen DIN 40050), i.e., it is resistant to dust and water spray. The ground plates, each of which includes a plurality of motor plates, are connected together in groups. Each respective group is supplied with energy by a supply cable that is contained in the partial conduit portion. For this purpose the supply cable passes through a bore in the intermediate cover to a connecting cable between the ground plates in the spatial center of one of the groups.

The upper wall of the cable conduit has threaded cable connectors through which the cables are passed that lead from each motor bar to the individual drives. It is advantageous to attach the cable conduit to the machine near the individual drives. With ring spinning machines, that means the lower portion of the machine, where space is always available near the floor.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 4 is a front view, with parts in section, of the installed cable conduit.

DETAILED DESCRIPTION OF A PREFERRED EMBODIMENT

Figure 1:
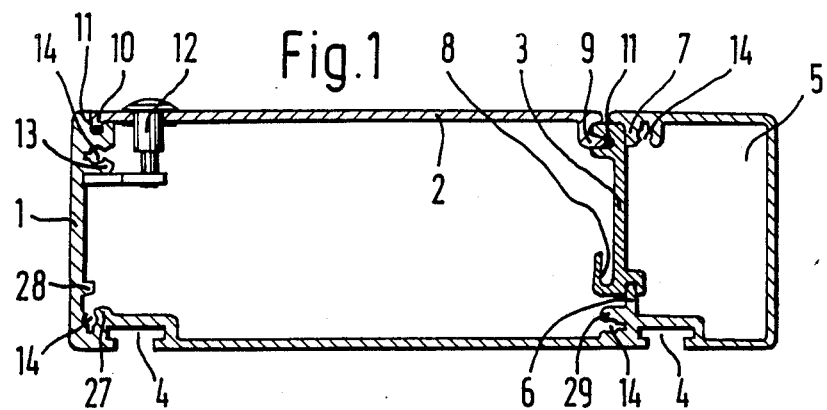
FIG. 1 is a section through the cable conduit.

Referring now in detail to the drawings, there is illustrated in FIG. 1 a cable conduit comprised generally of a housing 1, a cover 2 and an intermediate cover 3. These elements are made from extrusion-shaped aluminum, and they have a plurality of full-length grooves and webs or projections by which they are joined together or which are provided to receive other elements.

Two grooves 4 with reverse cuts are shown on the back wall of the housing 1. Connecting elements, such as rotation-proof screws, are pushed into these grooves, serving there to make it possible to secure the cable conduit to the machine in a desired position in the longitudinal direction.

A partial conduit 5 is segregated inside the housing 1 by means of the intermediate cover 3. A groove in this intermediate cover encloses a web 6 formed on the housing, and its other long side engages a projection 7 formed on the housing. A groove 8 is formed on the intermediate cover 3 and is intended to receive a flat cable, such as is required, for example, in a ring spinning machine to regulate the rotational speed of the spindle drives.

On each of its long sides, the cover 2 has respective webs 9 and 10. The web 9 engages in a groove in the intermediate cover 3, while the other web 10, which is aligned perpendicularly to the web 9, engages in a groove in the housing 1. Seals 11 are placed in these grooves, so that the closed cable conduit is resistant to both dust and water spray, thus satisfying the protection standard IP 54.

The insertion of the cover 2 presses the intermediate cover 3 against the projection 7. The cover is held in position by rotary locks 12, which engage behind a projection 13 in the housing 1. The rotary locks can only be moved by the use of a tool, thus preventing an accidental opening of the cable conduit.

Certain thickened areas are formed in the shape of the housing as a result of the projections 7 and 13 in the housing 1 and the exterior grooves 4. Full-length round grooves 14 are provided at these locations, in which self-cutting screws 15 engage to secure end plates 16 (FIG. 4). The frontal surfaces of the housing 1 and the cover 2 are covered with a sealing material for contact with the end plates 16, in order to satisfy the requirements of protective standard IP 54.

Because textile machines, particularly ring spinning machines, are very long, it is necessary to divide the cable conduit into sections which are easy to handle during installation. The sections are connected with each other with the aid of a two-part sleeve 17, 18. The sleeve is made from an elastic material.

Figure 2:
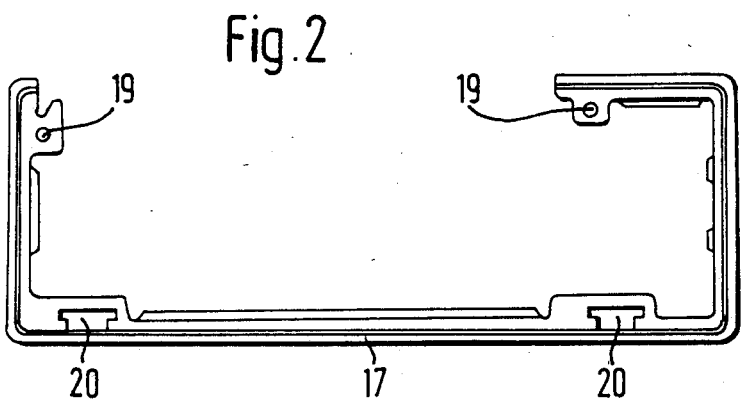
FIG. 2 is a side view of the sleeve portion that connects the housing.

FIG. 2 shows the sleeve portion 17 joining the housing 1 of the cable conduit. The exterior frontal surfaces of the housing 1 are completely encompassed by the sleeve portion 17 and the interior frontal surfaces are mostly so encompassed. Pins 19 are inserted into the areas of thickened material at the free ends of the sleeve portion 17, which pins engage on both sides in round grooves 14 in the housing 1. T-shaped projections 20 formed on the back side of the housing engage the sleeve portion 17 in the grooves 4.

Figure 3:
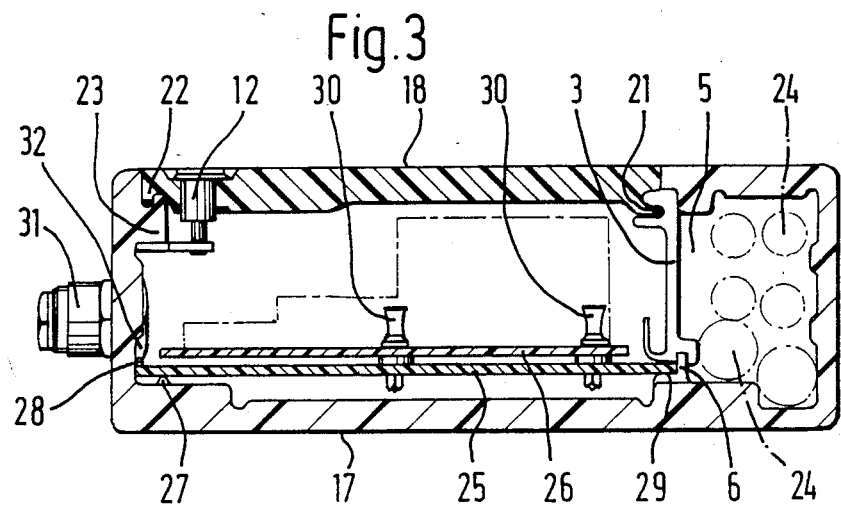
FIG. 3 is a section through the installed two-part sleeve.

The covers 2 of adjacent sections are connected with each other by the sleeve portion 18, as shown in FIGS. 3 and 4. Like the cover 2, the sleeve portion 18 also includes respective webs 21 and 22 on its two ends. The web 21 engages in abutting grooves of adjacent intermediate covers 3, while the other web 22, aligned perpendicularly to web 21, engages in a groove on the sleeve portion 17. The sleeve portion 18 is held in place by a rotary lock 12 that engages behind a projection 23 in the sleeve portion 18.

The two-part sleeve 1 7, 18 thus interrupts the housing 1 and cover 2 of the cable conduit, while the intermediate covers 3 abut one another. The connection of the sections by the sleeve also satisfies the requirements established by protective standard IP 54. To stabilize the connection it is possible to make the pins 19 of steel. The sleeve portion 17 can also be provided on its long side, as can the sleeve portion 18, with a steel insert.

It is shown in FIG. 3 that the partial conduit 5 is intended to receive power cables 24. Ground plates 25, which in turn contain motor bars 26, are housed in the portion of the cable conduit that is accessible through the cover 2. The ground plates are pushed into a groove formed in the housing by projections 27 and 28. They lie against the web 6 and are pressed against a stop 29 by the intermediate cover 3. The ground plates are thus secured without additional means and they can be built without being in sections, i.e., without a sleeve.

For the energy supply a plurality of ground plates are connected into respective groups. Each such group receives power from a power cable 24 through a bore in the intermediate cover 3. Thus, the number of power cables in the partial conduit 5 is considerably reduced.

Several motor bars 26 are secured to a ground plate 25 with the aid of holding elements 30. The broken lines indicate the possible equipping of the motor bars with switching and regulating devices. A cable leads from each motor bar 26 to an individual drive of the textile machine. The cable is guided out of the housing through bores in the housing 1 with the aid of threaded cable connectors 31. The bores are placed such that the threaded cable connectors are tightened from the outside. The cable connectors 31 are secured by securing nuts 32. The bores receiving cable connectors 31 are placed in such a manner that securing nuts 32 abut a surface of projection 28 so as to be non-rotatable within housing 1. The threaded cable connectors are also protected against dust and water spray according to IP 54.

The cable conduit according to the invention is easy to install. It can be adapted to any length of machine, as can its sections be adapted to given partial sections of the textile machine. The construction of the cable conduit and the connection of its sections are sufficiently stable that it can be screwed, self-supporting, to the machine frame with the above-described securing means.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A cable conduit for textile machines, said cable conduit adapted to contain supply cables, ground plates, and motor bars connected to said ground plates for the drive and control of an individual drive of the textile machine, comprising:
    a housing;
    a detachable cover provided on said housing;
    an intermediate cover connected to said housing, said intermediate cover dividing said housing into a partial conduit which is not accessible from the outside adapted to receive said supply cables, and a portion which is covered by said detachable cover and adapted to receive said ground plates and motor bars; and
    means formed in said housing for securely receiving said ground plates in the portion of said housing covered by said detachable cover;
    wherein said means for securely receiving said ground plates in said housing comprises a first groove formed in said housing and positioned such that a portion of each of said ground plates can be received therein and then the ground plates securely clamped in place in said housing by means of said intermediate cover.

2. The cable conduit of claim 1, wherein said housing is provided with a first web, said intermediate cover is provided with a first groove mating with said first web, and said intermediate cover is clamped to said housing by means of said detachable cover.

3. The cable conduit of claim 2, wherein a first and second web are formed on said detachable cover, said first and second webs mating, respectively, with a second groove formed on said intermediate cover and a second groove formed on said housing, and said detachable cover is secured to said housing by means of rotary locks.

4. The cable conduit of claim 3, wherein said second groove formed on said intermediate cover and said second groove formed on said housing are each provided with a seal.

5. The cable conduit of claim 1, wherein said housing, said detachable cover, and said intermediate cover are made from an extrusion-shaped aluminum.

6. The cable conduit of claim 1, wherein a groove is formed on said intermediate cover for receipt of a flat cable.

7. The cable conduit of claim 1, wherein a plurality of full-length round grooves are formed on said housing for receipt of self-cutting screws, an end plate is provided for each end of said housing, and self-cutting screws sealingly secure said end plates at each end of said housing.

8. The cable conduit of claim 1, wherein a plurality of full-length grooves having a reverse cut for receipt of screw heads are formed on said housing to secure said cable conduit to a textile machine.

9. The cable conduit of claim 1, wherein said intermediate cover is provided with a bore, so that when ground plates are connected with each other in groups, each respective group of ground plates can be supplied with energy by a supply cable which is guided by the bore provided in the intermediate cover.

10. A cable conduit for textile machines, said cable conduit adapted to contain supply cables, ground plates, and motor bars connected to said ground plates for the drive and control of an individual drive of the textile machine, comprising:
   a housing;
   a detachable cover provided on said housing;
   an intermediate cover connected to said housing, said intermediate cover dividing said housing into a partial conduit which is no accessible from the outside adapted to receive said supply cables, and a portion which is covered by said detachable cover and adapted to receive said ground plates and motor bars; and
   means formed in said housing for securely receiving said ground plates in the portion of said housing covered by said detachable cover;
   wherein said cable conduit is divided into sections which are connected with one another and sealed with respect to one another by means of a two-part sleeve made from an elastic material; and
   wherein a plurality of full-length round grooves are formed on said housing for receipt of self-cutting screws, a plurality of full-length grooves having a reverse cut for receipt of screw heads are formed on said housing, wherein said two-part sleeve comprises a first sleeve portion which connects one housing with an adjacent housing, said first sleeve portion surrounding the wall portions of said adjacent housing, said first sleeve portion having a plurality of integral projections which engage with the plurality of full-length grooves having a reverse cut formed on said one housing and a plurality of pins are inserted in said first sleeve portion engaging the plurality of full-length round grooves formed on said one housing.

11. The cable conduit of claim 10, wherein said two-part sleeve further comprises a second sleeve portion which connects one detachable cover with an adjacent detachable cover, said second sleeve portion having a first and a second web formed thereon, said intermediate cover having a groove formed thereon and said first sleeve portion having a groove formed thereon, said first web formed on said second sleeve portion mating with said groove formed on said intermediate cover, said second web formed on said second sleeve portion mating with said groove formed on said first sleeve portion and said second sleeve portion is provided with a rotary lock which holds said second sleeve portion between said one detachable cover and said adjacent detachable cover.

12. A cable conduit for textile machines, said cable conduit adapted to contain supply cables, ground plates, and motor bars connected to said ground plates for the drive and control of an individual drive of the textile machine, comprising:
   a housing;
   a detachable cover provided on said housing;
   an intermediate cover connected to said housing, said intermediate cover dividing said housing into a partial conduit which is not accessible from the outside adapted to receive said supply cables, and a portion which is covered by said detachable cover and adapted to receive said ground plates and motor bars; and
   means formed in said housing for securely receiving said ground plates in the portion of said housing covered by said detachable cover;
   wherein one wall of the housing is provided with cable connectors to guide a cable from a motor bar to an individual drive of the textile machine; and
   wherein said means for securely receiving said ground plates in said housing comprises a groove formed in said housing, said groove being formed by a projection on the housing, said cable connectors are secured in said housing by means of securing nuts, and said securing nuts are positioned to abut a surface of said projection so as to be non-rotatable within said housing.

* * * * *